United States Patent [19]

Chang

[11] 4,386,173
[45] May 31, 1983

[54] HOT MELT CORROSION RESISTANT COMPOSITIONS CONTAINING EPOXY RESINS

[75] Inventor: Yun F. Chang, Plymouth, Mich.

[73] Assignee: Ford Motor Company, Dearborn, Mich.

[21] Appl. No.: 394,734

[22] PCT Filed: Apr. 23, 1982

[86] PCT No.: PCT/US82/00527

§ 371 Date: Apr. 23, 1982

§ 102(e) Date: Apr. 23, 1982

[51] Int. Cl.³ .............................................. C08K 5/36
[52] U.S. Cl. .................................... 523/453; 252/395; 523/465
[58] Field of Search ................ 523/453, 465; 252/395

[56] References Cited

U.S. PATENT DOCUMENTS

| | | | |
|---|---|---|---|
| 2,374,565 | 4/1945 | Roden | 106/14 |
| 2,430,846 | 11/1947 | Morgan | 106/14 |
| 2,573,878 | 11/1951 | Schiermeier et al. | 106/14 |
| 2,758,981 | 8/1956 | Cooke et al. | 260/33 |
| 2,995,532 | 8/1961 | Cantrell et al. | 260/19 |
| 3,313,635 | 4/1967 | Wollek et al. | 106/14 |
| 3,746,643 | 7/1973 | Rogers | 252/33 |
| 4,150,192 | 4/1979 | Downey | 428/462 |

*Primary Examiner*—Melvyn I. Marquis
*Attorney, Agent, or Firm*—Lorraine S. Melotik; Roger L. May

[57] ABSTRACT

This invention relates to a sprayable hot melt corrosion preventative composition and process for making the composition. The composition is characterized by comprising: (1) between about 10 and about 25 parts by weight of an epoxy resin elastomer adduct mixture, (2) between about 10 and about 25 parts by weight microcrystalline wax; and (3) between about 50 and about 80 parts by weight of a dispersion of petroleum sulfonate complex in nonvolatile diluent oil. The total weight of (1), (2) and (3) is 100 parts. The composition may additionally comprise up to about 20 parts by weight of optional materials such as pigments, fillers, and/or additional nonvolatile oil. The process for making the composition includes providing the adduct material which is maintained at an elevated temperature, blending the wax therein, heating the dispersion and adding thereto the adduct-wax mixture.

15 Claims, No Drawings

HOT MELT CORROSION RESISTANT COMPOSITIONS CONTAINING EPOXY RESINS

TECHNICAL FIELD

This invention relates to hot melt coating compositions which possess corrosion and rust preventive properties. More particularly, this invention relates to 100 percent solids coating compositions containing epoxy resins and rust inhibiting sulfonates, and having low melt viscosity so as to be applicable as hot melt corrosion resistant sealers. Most particularly, the corrosion preventative compositions of the invention possess outstanding adhesion to metal substrates and comprise an adduct mixture formed by reacting epoxy resins and liquid reactive elastomer, a dispersion of petroleum sulfonate complex in nonvolatile diluent oil, and microcrystalline wax.

BACKGROUND ART

Inhibiting rust formation on various metal surfaces, particularly iron-containing automotive products which are exposed to salt, is highly desirable. Various solutions for preventing rust formation have been suggested in the past. It is a well known practice to coat the under body of automobiles with materials possessing corrosion preventive properties. To this end, both in-point-of manufacture and after market applications, numerous materials and formulations have been utilized.

Most of these rust preventive corrosion compositions are based on chemically inert grease or wax-like materials. Typical of these formulations are those taught in U.S. Pat. Nos. 2,374,565, 2,430,846, 2,573,878, 2,995,532, 3,313,635, 2,746,643 and 4,150,192. In U.S. Pat. No. 3,746,643, calcium and magnesium sulfonates in a minor amount of mineral oil are taught to be useful as rust inhibitor coatings when combined with a microcrystalline wax. U.S. Pat. No. 4,150,192 teaches a sprayable hot melt rust inhibitor composite comprised of a mixture of a sulfonate, optionally a carbonate, optionally an oxidized petroleum, diluent oil, microcrystalline wax, active filler and thermoplastic resin. The composite is taught as useful for coating automobiles.

Because these prior art coating compositions are generally non-drying and lacking in cohesive strength, they can readily be removed by abrasion, impact, or elevated temperatures, and therefore require frequent inspection to determine the adequacy of the protection being afforded the coated metallic surfaces.

Elastomers have been incorporated into rust preventative compositions in an attempt to improve their cohesive strength. However, because of the extremely high viscosity of such elastomers, they can only be incorporated in a very limited quantity. The compositions containing higher levels of elastomers have a very high viscosity and cannot be sprayed unless diluted with organic solvent. However, the incorporation of such volatile solvents is undesirable for a variety of reasons, including potential fire hazard and toxicity. Epoxy resins generally have a lower viscosity than such elastomers and are known for their superior cohesive strength when used as a coating binder. However, due to the poor compatibility between epoxy resins and petroleum sulfonate complexes commonly used in rust preventative composition, epoxy resins have not been successfully blended homogeneously into such compositions.

DISCLOSURE OF INVENTION

The invention of the subject application is directed to a sprayable hot melt corrosion preventative composition and process for making the composition. The composition is characterized in that it comprises: (1) between about 10 and about 25 parts by weight of an epoxy resin-elastomer adduct mixture, (2) between about 10 and about 25 parts by weight microcrystalline wax; and (3) between about 50 and about 80 parts by weight of a dispersion of petroleum sulfonate complex in nonvolatile diluent oil. The total weight of (1), (2) and (3) is 100 parts.

In this composition the adduct mixture is formed by reacting (a) epoxy resin having a number average molecular weight ($\overline{M}_n$) between about 150 and about 2000, preferably between about 200 and about 1500, and (ii) having two or more epoxide groups per molecule and (b) reactive elastomer (i) having a number average molecular weight ($\overline{M}_n$) of between about 2000 and about 10,000, preferably between about 2,500 and about 5,000, (ii) having a reactive functionality capable of reacting with the epoxide group of the epoxy resin and (iii) being liquid at 20° C.-25° C. Epoxy resin (a) and elastomer (b) are combined in amounts providing between about 1.8 and about 3.0, preferably between about 1.8–2.5 epoxide group of the epoxy resin for each reactive functionality of the elastomer and reacted so as to convert at least about 80% of the reactive functionality of the elastomer. The nonvolatile oil of the dispersion has a boiling point of at least 230° C. and the sulfonate complex comprises between about 30 and about 80 weight percent of the dispersion.

The composition may additionally comprise up to about 20 parts by weight of optional materials such as pigments, fillers, and/or additional nonvolatile oil.

In the process of the subject invention for making the above described composition, the epoxy resin and elastomer are first reacted at an elevated temperature to form an epoxy-elastomer adduct mixture. While maintaining this mixture at an elevated temperature, a microcrystalline wax is subsequently homogeneously blended into this mixture. After the dispersion of sulfonate in non-volatile diluent oil is heated to an elevated temperature, the adduct wax mixture is blended in to form a homogeneous composition.

New corrosion preventive compositions have now been found which incorporate epoxy resins and the petroleum sulfonate complex and overcome the deficiencies of previously known undercoating compositions to provide a hot melt sprayable coating composition exhibiting outstanding adhesion and corrosion protection to metal surfaces. The incorporation of epoxy resins with the sulfonate complex in the composition of this invention is possible, it appears, because prior to incorporation of the sulfonate complex, the epoxy resin is reacted with elastomer to form an epoxy resin-elastomer adduct. While it is known that the sulfonate complex lacks compatibility with epoxy resins, we have determined that the petroleum sulfonate complex can be admixed with the epoxy resin-elastomer adduct to form a homogeneous corrosion preventive composition with very desirable properties.

The composition of the present invention, apart from producing a firm, abrasion resistant, corrosion resistant film, also provides a film having vibration damping and sound deadening properties. The compositions contain no organic solvents and therefore are pollution free.

BEST MODE FOR CARRYING OUT THE INVENTION

In order to prepare the new corrosion preventive compositions of the subject invention, the epoxy resin and the liquid reactive elastomer are first combined and then reacted at elevated temperatures to form the epoxy resin elastomer adduct mixture. They are combined and reacted in an amount which provides between about 1.8 and about 3.0, preferably between about 1.8 and about 2.5, most preferably between about 2.0 and 2.5, epoxide groups of the epoxy resin for each reactive functionality of the liquid elastomer capable of reacting with the epoxide group of the resin (e.g., —COOH, —NH$_2$, —OH). Since the epoxide group is much in excess of the epoxide reactive functionality of the elastomer, the reaction product mixture comprises an epoxide terminated liquid elastomer. Generally the epoxy, in liquid or particulate form, is added to the heated elastomer. The mixture is then reacted for a time and at a temperature necessary to react at least about 80%, preferably at least about 90%, most preferably at least 95%, of the epoxide reactive functionality of the elastomer with the epoxide of the epoxy resin. The selection of reaction conditions suitable for the formation of the adduct depends on the particular epoxy resin and liquid reactive elastomer used. Such time/temperature reaction conditions as are employed with particular epoxy resins-liquid reactive elastomer combinations are detailed in the examples, however, it should be borne in mind that the examples are merely exemplary of a few such compositions which may be used to form the coating of the subject invention. In one embodiment, epoxy resin and carboxy functional elastomer are reacted for about 20–30 minutes at 100°–110° C. The percent conversion of reactive functionality can be analytically followed as, for example, by titration of the (—COOH) acid member. The selection of suitable reaction conditions to effect the formation of the adduct using other suitable epoxy resins elastomer compositions within the scope of this invention and suitable methods for determining percent conversion would be well within the skill of one in the art.

Although a catalyst may be added to the epoxy resin-liquid reactive elastomer mixture to promote reaction between the epoxide group of the epoxy resin and the epoxide reactive functionality of the elastomer, such addition is neither generally required nor desirable, since the incorporation of such a catalyst may catalyze the adduct formation at too rapid a rate. However, when desirable, suitable catalysts which may be employed will be apparent to one skilled in the art, their selections of course depending on the particlar reactive functionality of the elastomer. Suitable catalyst to effect reaction of, for example, the epoxide (epoxy resin)/carboxyl (elastomer) reaction include, but not limited to tetrabutylammonium chloride (or the bromide or iodide thereof), trimethyl benzylammonium chloride, 2-methyl-4-ethylimidazole, N-methylmorpholine, stannous octoate, and zinc naphthenate.

Because of the non-compatibility of epoxy resins and the sulfonate dispersion, the formation of the epoxy-elastomer adduct is an essential step to obtaining a homogeneous mixture of the corrosion preventive composition. Since the liquid reactive elastomer are generally compatible with petroleum sulfonate dispersion, and the adduct has the physical properties of liquid reactive elastomers and epoxy resins, the formation of the adduct aids in obtaining a homogeneous mixture. However, while this explanation has been advanced to explain the compatibility of the sulfonate complex with the epoxy resin-elastomer adduct, neither its validity nor its understanding is necessary for the practice of the invention.

After formation of the adduct as described above, between about 10 and about 25 parts by weight of microcrystalline wax is blended into between about 10 and about 25 parts by weight of the adduct mixture, while maintaining the mixture at an elevated temperature, as for example, the 100°–110° C. noted above. In a separate container, the petroleum sulfonate complex dispersion is heated to an elevated temperature (e.g., 100°–110° C.). The heated adduct-wax mixture (20–50 parts by weight) is then added to between about 50 and about 80 parts by weight of the sulfonate dispersion, with continuous stirring and while maintaining an elevated temperature until a uniform composition is obtained. If desired, optional materials such as pigments, fillers, and/or additional diluent oil may thereafter be incorporated. The resulting mixture is then usually removed from the mixer and cooled.

The composition thus obtained can be extruded or sprayed as a hot melt material. By using a Nordson hot melt unit (Model HM-X1 available from Nordson Corporation, Amherst, Ohio), the composition can be sprayed at a temperature of between about 120°–160° C.

Generally, a coating of the composition is applied to a substrate, typically a metal substrate, itself having a temperature in the range of about 20° C. to about 40° C., where it sets up generally within about 10 seconds, without the requirements of volatile solvents evaporation. Applied coatings generally have a thickness in the range of about 3 to about 20 mils. The metal substrate itself may be bare metal, may have a coat of primer on it, or may be painted before application of the hot melt composition.

As noted above, the corrosion preventive compositions employ, in combination, an epoxy resin or a mixture of epoxy resins, a liquid reactive elastomer with functional groups capable of reacting with the epoxide group of the epoxy resins, petroleum sulfonate complex dispersed in oil, microcrystalline wax, and optionally pigments, fillers, and/or additional diluent oil. Each component is described in detail below.

EPOXY RESINS

The epoxy resin useful in the composition of this invention is a low molecular epoxy containing two or more epoxide groups per molecule and having a number average molecular weight ($\overline{M}_n$) of between about 150 and about 2000, preferably between about 200 and about 1500. This epoxy resin can be a liquid or solid and can be either a single epoxy resin or a mixture of suitable epoxy resins.

Examples of suitable diepoxides include, but are not limited to: condensation products of bisphenol-A with epichlorohydrin, examples of which are commercially available as Epon 826, 828, 1001, and 1002 (marketed by Shell Chemical Company); Araldite 6010 and 6020 (marketed by Ciba-Giegy); ester type diepoxides such as diglycidyl phthalate, diglycidyl adipate, and diglycidyl glutarate; cycloaliphatic diepoxides such as vinyl cyclohexane dioxide and Araldite CY-179 (marketed by Ciba-Giegy Corporation); and aliphatic ether type diepoxides such as ethylene glycol, diglycidyl ether, 1,2-propylene glycol, diglycidyl ether and 1,4-butane-diol diglycidyl ether (Araldite RD-2 marketed by Ciba- Giegy). The epoxy may also be substituted with halogens such as chlorine or bromine. The incorporation of the bromine functionality in the epoxy gives fire retardant properties.

Especially suitable are the reaction products of epichlorohydrin and bisphenol-A having chemical formula I:

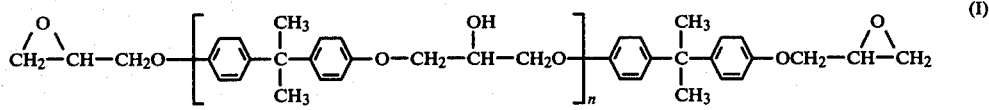

Such products include diglycidyl ether of bisphenol-A (DGEBA), i.e., when n=0, and its higher molecular weight species. The lower molecular weight liquid products have an n value about 1 or below. Above n=1, the resins are brittle solids. Preferred epoxy resins, for the compositions of this invention, comprise those with n=3 or less than 3, the typical properties are illustrated in Table A.

TABLE A

| | Melting Range, °C. | Epoxide Equivalent | Molecular Weight Average | In the Formula Average Value |
|---|---|---|---|---|
| Epon 828 | Liquid | 175–210 | 380 | 0 |
| Epon 1001 | 64–76 | 450–550 | 950 | 2 |
| Epon 1002 | 75–85 | 600–700 | 1,300 | 3 |

Other examples of epoxy compounds useful as the epoxy resin of this composition include polyepoxide compounds (averaging more than about 2 epoxy group per molecule). In this group of epoxy compounds are the Novolac epoxy resins which are produced from the reaction of phenol and formaldehyde, subsequently with epichlorohydrin. Examples of commercially available materials in this group of epoxy compounds include Cresol Novolac Araldite ECN resins 1235, 1273, 1280 and 1299 (marketed by Ciba-Giegy Corporation, Ardsley, N.Y.). Other commercially available Novolac resins include Epon 1138 and 1139 (marketed by Shell Chemical Company, Houston, Tex.).

While these Novolac epoxy resins have been found suitable for use in the corrosion composition, the epoxy resins of the subject composition preferably comprise diepoxides, and most preferably the DGEBA resins described above.

LIQUID REACTIVE ELASTOMERS

The elastomers suitable for use in the composition of this invention contain reactive functionalities, in contrast to the liquid rubber systems widely used in the area of elastomeric sealants, caulks, binders, potting-encapsulation, and structural adhesives which generally contain no such reactive groups. The reactive elastomers useful in the composition of this invention include a functional group, e.g., carboxyl, hydroxyl, or amino groups, with carboxyl being preferred, that will react with the epoxide group of the epoxy resin. These elastomers are low molecular weight materials having a number average molecular weight ($\overline{M}_n$) of between about 2000 and about 10,000, and are in the liquid state at ambient temperature, i.e., 20°–25° C.

Examples of such liquid reactive elastomers which may be used in the composition of this invention include, but are not limited to, reactive liquid rubbers such as carboxyl-terminated butadiene polymer and carboxyl-terminated butadiene/acrylonitrile copolymer. Generally these liquid rubbers contain, on the average, about 2 terminal carboxyl groups per molecule so as to be essentially considered a dicarboxylic acid elastomer. Carboxyl-terminated butadiene polymer and carboxyl terminated butadiene/acrylonitrile copolymer are commercially available, for example, from B. F. Goodrich Chemical Co., Chemical Group, Cleveland, Ohio under the tradename of Hycar polymer: 2000×162 (CTB), 2000×156 (CTB), 2000×165 (CTB), 1300×15 (CTBN), 1300×8 (CTBN) and 1300×13 (CTBN), the first three listed Hycar polymers being butadiene polymers and the last three being butadiene/acrylonitrile copolymers. Amino terminated butadiene/acrylonitrile copolymer is likewise available, for example, under the tradename Hycar 1300×21 (BN). Suitable hydroxy terminated butadiene/acrylonitrile copolymer is available, for example, under the tradename Hycar 1300×29.

While butadiene polymer and butadiene/acrylonitrile copolymers have been taught as suitable elastomers for use in this invention, other elastomers such as polychloroprene, polyisobutylene, polyisoprene and acrylic based elastomers may be used, as long as they possess the desired reactive functionality and physical limitations described above. The selection of suitable reactive liquid elastomers for use in this composition would be well within the capability of one skilled in the art.

As would be apparent to one skilled in the art, mixtures of suitable liquid reactive elastomers may also be used in the composition of the subject invention.

PETROLEUM SULFONATE COMPLEX DISPERSION

The petroleum sulfonate complex has the general formula:

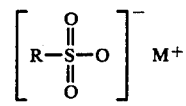

where R is a petroleum hydrocarbon and/or a mixture of other materials such as olefin, olefin polymer, natural fats, fatty oils and waxes. The cation M+ is generally sodium, calcium, barium, or magnesium. Sulfonate complexes may be obtained by sulfonating various petroleum fractions or their mixtures with sulfuric acid, chlorosulfonic acid, sulfur trioxide and their mixtures. The petroleum hydrocarbons may be aliphatic, cyclic and/or aromatic. One such petroleum sulfonate complex may be produced, for example, by treating a mineral oil (having a Saybolt Universal viscosity of about 39° C. of from about 400 to 540 seconds) with fuming sulfuric acid, preferably in small increments. After a calculated amount of sulfuric acid has been added to the oil, the sludge which forms is removed and the acid-treated oil containing dissolved oil-soluble sulfuric acid is neutralized with a solution of sodium hydroxide. The aqueous alkali solution is removed from the mixture and the sodium salts of petroleum sulfonic acid extracted with alcohol, the alcohol layer containing the sulfonates can be removed by distillation or by any other suitable means. The preparation of petroleum sulfonates is well known in the literature and such teachings can be found in U.S. Pat. Nos. 2,395,713; 2,413,199; 2,414,773; 2,416,397; and if desired the petroleum sulfonates may be purified by means disclosed in U.S. Pat. Nos. 2,236,993; 2,334,532; 2,357,866; 2,368,452 and 2,406,703. The teachings of these patents regarding the preparation and purification of petroleum sulfonates is hereby incorporated by reference in this application as suitable for similar use herein. For ease of incorporating the metal salt of the sulfonate complex (which is a very hard solid) into the composition, it is employed dispersed in a non-volatile oil. Suitable oils for use herein have a boiling point above about 230° C., e.g. mineral lubricating oils and synthetic lubricating oils. Commercially available dispersions of the petroleum sulfonate complex in oil are available, for example, from Witco Chemical Corporation New York, N.Y., under the tradename of SACI (Severe Atmospheric Corrosion Inhibitor). Examples of such SACI materials which may be employed in the subject composition includes, but is not limited to, CI-51 and SACI 200-A. Alox Corporation, Niagra Falls, N.Y., also supplies petroleum sulfonate dispersions useful as corrosion inhibitors.

Suitable sulfonate complex dispersions for use in this invention are those wherein the sulfonate complex comprises between about 30 and about 80 weight percent of the dispersion. More preferably the sulfonate complex comprises between about 50 and about 70 weight percent, most preferably about 50 weight percent of the dispersion employed in the composition of this invention. It can be seen from the limitations of the composition relative the dispersion, that between about 15 and about 64 parts of sulfonate complex will be present in 100 parts composition consisting of adduct, microcrystalline wax and dispersion. However, it has been found that for optimal composition properties, the parts of dispersion and its sulfonate complex percentage be chosen (from within that taught) so as to provide between about 25 and about 40 parts sulfonate complex (per 100 parts of composition as taught above). Preferably, the sulfonate is a calcium or magnesium sulfonate.

MICROCRYSTALLINE WAX

Wax has been used extensively in hot melt formulations with the prime function of reducing the melt viscosity of a hot melt blend. It is also quite common to include wax in corrosion resistant coating because of the excellent moisture barrier properties. The waxes used in hot melt compositions may be classified into two major categories, paraffin waxes and microcrystalline waxes. Paraffin waxes are composed of mostly straight chain and a few branched or cyclic hydrocarbons. The straight chain hydrocarbon in paraffin waxes facilitate the growth of large crystalline regions. It is the lack of molecular chain between the crystalline regions which causes the low cohesive strength of paraffin wax. This in turn is reflected in the poorer adhesive and cohesive properties of hot melt compositions containing paraffin wax. Microcrystalline waxes have much fewer straight chain and many more branched and cyclic groups than paraffin waxes. These waxes, therefore, are usually more flexible and generally softer than a comparable paraffin wax. Microcrystalline waxes also have moderate adhesion and cohesion and consequently will form fairly good heat seals.

Many microcrystalline waxes which would be suitable for use as the microcrystalline wax component of the subject composition are commercially available, as for example, from Witco Chemical Corporation, New York, N.Y. under the tradename Multi Wax, e.g., ML-445 and 110-X. The selection of a microcrystalline wax suitable for use in the subject invention composition would be within the skill of one in the art. While any microcrystalline wax could be suitably used in the composition of this invention, (microcrystalline waxes having a relatively narrow melting point range), particularly useful waxes have melting points which are preferably, however not limited to, between about 65° and 85° C.

As would be apparent to one skilled in the art, suitable mixtures of microcrystalline waxes may also be employed in the subject composition.

OPTIONAL COMPONENTS INCLUDING PIGMENTS, FILLERS, AND DILUENT OILS

In addition to the above discussed components, other materials may optionally be included in the hot melt corrosion preventative composition of this invention. When included, these materials comprise additionally between about 0 and about 20 parts by weight, i.e., in addition to the 100 parts by weight of composition consisting of epoxy resin elastomer adduct mixture, microcrystalline wax and sulfonate dispersion. Examples of such materials include pigments, flame retardants, antioxidants, and nonvolatile diluent oil. The preferred pigments for the composition are aluminum flakes or carbon black. Flame retardants used to retard the flammability of the coating materials, include alumina trihydrate, and phosphorus containing compounds. Thixotropic agents used to control the flow characteristics of the corrosion preventative composition include such materials as fumed silica and fumed alumina. While nonvolatile diluent oil has been used as the dispersing medium for the sulfonate, additional diluent oil may be included in the composition in order to improve the wetting of the substrate during application or to facilitate application by reducing viscosity as, for example, during spray application. A wide range of such nonvolatile diluent oils are available for use in the subject composition. Suitable oils have a boiling point above about 230° C. and include, but are not limited to, such oils as mineral lubricating oils and synthetic lubricating oils. Other such optional components which may be included in this composition are well known to one skilled in the art.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

| Ingredients | Parts by Weight |
| --- | --- |
| Carboxyl-terminated Butadiene (Hycar 2000 X 165; carboxy eq. wt. 2000) | 10 |
| Epoxy Resin (Epon 828; epoxide eq. wt. 175-210) | 3 |
| Microcrystalline Wax (M.P. 75°-82° C.) (Multi Wax ML-445)* | 13 |

-continued

| Ingredients | Parts by Weight |
|---|---|
| Petroleum sulfonate dispersion (in 50% non-volatile oil; CI-51)** | 74 |

*Available from Witco Chemical Corp., New York, N.Y.
**A calcium sulfonate available from Witco Chemical Corp., New York, N.Y.

In a mixing tank equipped with a high shear stirrer and heating element, carboxyl-terminated butadiene polymer was charged and heated to 100°–110° C. With the temperature kept at 100°–110° C. and the stirring maintained, epoxy resin was added and the reaction was continued for 20 minutes. Then, while maintaining the temperature, the microcrystalline wax was blended into the adduct to form a homogeneous mixture. In a separate mixing tank, the petroleum sulfonate dispersion was heated to about 100°–110° C. Then the adduct mixture microcrystalline wax was added to this petroleum sulfonate with control stirring and while maintaining elevated temperatures until a uniform composition is obtained. This composition is light brown in color and a rubber-like, non-fluid gel at ambient temperature. The composition thus obtained was charged into a Nelson hot melt unit (Model HM-X1) and sprayed at about 135° C. to an oily steel panel to give a uniform, firm slightly tacky coating. A panel, which was coated with this composition to a film thickness of between 8 to 10 mils and then the coating scribed with a fine line to the bare metal, was placed in salt spray test. The salt spray test was run with 5% salt solution at about 35° C. After exposure in the salt fog for 1000 hours, the coated panel showed no evidence of corrosion over the substrate surface and no corrosion creepage from the line scribed to bare metal.

EXAMPLE 2

The same composition and procedure as Example 1 were repeated except that 1 part of aluminum pigment, 2 parts of thixotropic agent (Cab-O-Sil PTG, available from Cabot Corp. Tuscola, Ill.) and 10 parts of diluent oil (Sunpar 2280, available from Sun Oil Corp. Radnor, Pa.) were blended into the petroleum sulfonate dispersion prior to combination with the adduct wax. The composition is gray in color and more thixotropic than the finished composition of Example 1. After being exposed to the salt spray test for 1000 hours, the coated panel did not show any corrosion or corrosion creepage.

EXAMPLE 3

| Ingredients | Parts by Weight |
|---|---|
| Carboxyl-terminated butadiene Polymer (Hycar 2000 × 165; carboxyl eq. wt. 2000) | 10 |
| Epoxy Resin (Epon 1001; epoxide eq. wt. 450–550) | 5 |
| Microcrystalline Wax (M.P. 75°–82° C.) (Multi Wax - ML 445) | 15 |
| Petroleum sulfonate dispersion (in 50% non-volatile oil CI-51) | 70 |

The same procedure as in Example 1 was repeated.
After salt spray testing as in Example 1, the coated panel did not show any corrosion or corrosion creepage.

EXAMPLE 4

| Ingredients | Parts by Weight |
|---|---|
| Carboxyl terminated butadiene polymer (Hycar 1300 × 9; carboxyl equivalent wt. 1500) | 12 |
| Epoxy Resin (Epon 1002; epoxide equivalent weight 600–700) | 13 |
| Microcrystalline wax (M.P. 75°–82° C.) (Multi Wax ML-445) | 25 |
| Petroleum sulfonate dispersion (in 50% non-volatile oil; CI-51) | 50 |

The same procedure as Example 1 was repeated except 15 parts of diluent oil (Sunpar 2280, available from Sun Oil Co. Radnor, Pennsylvania) was added to the finished composition and then was mixed uniformally. The coated panels showed no evidence of corrosion after 1000 hours in salt spray test.

EXAMPLE 5

| Ingredients | Parts by Weight |
|---|---|
| Carboxyl-terminated butadiene polymer (Hycar 1300 × 9; carboxyl equivalent weight 1500) | 8 |
| Epoxy Resin (Araldite 6060, epoxide equivalent weight 385–500) | 5 |
| Microcrystalline wax (M.P. 75°–82° C.) (Multi wax ML-445) | 12 |
| Petroleum sulfonate dispersion (in 50% non-volatile oil CI-51) | 75 |

The same procedure as Example 1 was repeated. The coated panels did not show any corrosion or corrosion creepage after 1000 hours in salt spray test.

EXAMPLE 6

| Ingredients | Parts by Weight |
|---|---|
| Carboxyl-terminated butadiene/acrylonitrile copolymer (Hycar 1300 × 15; carboxyl eq. wt. 2000) | 20 |
| Epoxy resin (Araldite CY-179; epoxide eq. wt. 131–143) | 3 |
| Microcrystalline wax (M.P. 65°–68° C.) (Multi wax 110-X)* | 12 |
| Petroleum sulfonate dispersion (in 50% non-volatile oil; CI-51) | 65 |

*Available from Witco Chemical Corp., New York, N.Y.

The same procedure as Example 1 was repeated. The coated panels showed no evidence of corrosion or creepage after 1000 hours in salt spray test.

EXAMPLE 7

| Ingredients | Parts by Weight |
|---|---|
| Carboxyl-terminated butadiene polymer (Hycar 2000 × 165; carboxyl eq. wt. 2000) | 10 |
| Epon resin (Ciba-Geigy ECN 1280; epoxide eq. wt. 230) | 3 |
| Microcrystalline wax (M.P. 65°–68° C.) (Multi Wax 110-X) | 20 |
| Petroleum sulfonate dispersion (in 50% non-volatile oil; CI-51) | 67 |

The same procedure as Example 1 was repeated. The coated panels did not show any corrosion or corrosion creepage after 1000 hours in salt spray test.

EXAMPLE 8

| Ingredients | Parts by Weight |
|---|---|
| Carboxyl-terminated butadiene polymer (Hycar 2000 × 165; carboxy eq. wt. 2000) | 10 |
| Epoxy resins (Epon 828; epoxide eq. wt. 175-210) | 2.0 |
| (Ciba-Geigy ECN 1280; epoxide eq. wt. 230) | 1.5 |
| Microcrystalline wax (M.P. 65°-68° C.) (Multi Wax 110-X) | 23.5 |
| Petroleum sulfonate dispersion (in 50% non-volatile oil; CI-51) | 63 |

The procedure as in Example 1 was repeated except that a mixture of epoxy resins was used in this composition. The coating showed excellent corrosion resistance in salt spray test.

EXAMPLE 9

| Ingredients | Parts by Weight |
|---|---|
| Amino-terminated butadiene acrylonitrile copolymer (Hycar 1300 × 21; amine eq. wt. 1200) | 12 |
| Epoxy resin (Araldite CY-179; epoxide eq. wt. 131-143) | 3 |
| Microcrystalline wax (M.P. 65°-68° C.) (Multi Wax 110-X) | 25 |
| Petroleum sulfonate dispersion (in 50% non-volatile oil; CI-51) | 60 |

In this Example, the procedure of Example 1 was followed with the materials above except that the reaction temperature was kept at 80°-90° C. (instead of 100°-110° C. as in previous examples). This composition also showed excellent corrosion resistance in salt spray test.

EXAMPLE 10

| Ingredients | Parts by Weight |
|---|---|
| Amino terminated butadiene acrylonitrile copolymer (Hycar 1300 × 21; amine eq. wt. 1200) | 9 |
| Epoxy resin (Epon 1001; epoxide eq. wt. 450-550) | 10 |
| Microcrystalline wax (M.P. 65-68° C.) (Multi Wax 110 - X) | 21 |
| Petroleum sulfonate dispersion (in 50% non-volatile oil; CI-51) | 70 |

The same procedure as Example 1 was repeated. The coated panels did not show any corrosion or corrosion creepage after 1000 hours in salt spray test.

EXAMPLE 11

| Ingredients | Parts by Weight |
|---|---|
| Hydroxy terminated butadiene acrylonitrile copolymer (Hycar 1300 × 29; Hydroxy eq. wt. 2000) | 20 |
| Epoxy resin (Araldite CY-179; epoxide eq. wt. 131-143) | 3 |
| Microcrystalline wax (M.P. 75°-82° C.) (Multi Wax ML-445) | 20 |
| Petroleum sulfonate dispersion (60% sulfonate in non-volatile oil; available from Witco Chemical Corp.) | 57 |

In this example, the liquid elastomer was first heated to 150°-160° C. Then the epoxy resin was added and the reaction was continued at 150°-160° for 1½ hours. Microcrystalline wax was then blended in. In separate mixing tank, petroleum sulfonate was heated to 100°-110° C. and the adduct and microcrystalline wax mixture were blended in to obtain a uniform composition.

The composition was applied to a steel panel as in Example 1. After being exposed to salt spray test for 1000 hours, the panel did not show any corrosion or corrosion creepage.

EXAMPLE 12

| Ingredients | Parts by Weight |
|---|---|
| Carboxyl terminated butadiene polymer (Hycar 1300 × 9; carboxyl eq. wt. 1500) | 8 |
| Epoxy resin (Araldite 6060, epoxide eq. wt. 385-500) | 5 |
| Microcrystalline wax (M.P. 75°-82° C.) (Multi Wax ML-445) | 10 |
| Petroleum sulfonate dispersion (35% sulfonate in non-volatile oil, available from Witco Chemical Corp.) | 77 |

A composition, was made from the above ingredients using the procedure of Example 5. After applying this composition to a metal panel, and subjecting the coated panel to salt spray test, the coated panel did not show any corrosion.

EXAMPLE 13

| Ingredients | Parts by weight |
|---|---|
| Epoxy resin (Epon 1001; epoxide eq. wt. 450-550) | 25 |
| Microcrystalline wax (M.P. 75°-82° C.) (Multi Wax ML-445) | 15 |
| Petroleum sulfonate dispersion (CI-51; in 50% non-volatile oil) | 60 |

In this example, no liquid reactive elastomer was used. The epoxy resin and the petroleum sulfonate dispersion were heated at 135° C. with stirring for 2½ hours. After the stirring was stopped, phase separation was observed. After cooling down to room temperature, the mixture was found to be not homogeneous.

EXAMPLE 14

| Ingredients | Parts by weight |
|---|---|
| Carboxyl terminated butadiene polymer (Hycar 2000 × 165; carboxyl eq. wt. 2000) | 25 |
| Microcrystalline wax (M.P. 65°-68° C.) (Multi Wax 110-X) | 15 |
| Petroleum sulfonate dispersion (CI-51 in 50% non-volatile oil) | 65 |

In this example, liquid reactive elastomer and petroleum sulfonate dispersion were mixed at 135° C. for 2½ hours. A uniform, syrup type mixture was obtained. This composition was unable to be applied as a coating material because it flows at ambient temperatures.

The foregoing examples are merely illustrative of the practice of this invention and those skilled in the art will readily recognize that modifications and variations may be made in these examples without departing from the scope of this invention as set forth in the appended claims.

INDUSTRIAL APPLICABILITY

It will be obvious from the foregoing that this invention has industrial applicability to metal surfaces in need of an adhesive corrosion preventative coating in particular those of motor vehicles and provides a coating composition which such outstanding properties which is hot melt sprayable.

I claim:

1. A hot melt corrosion preventative composition, characterized in that said composition comprises:
   (1). between about 10 and about 25 parts by weight of an epoxy resin-elastomer adduct mixture formed by reacting:
      (a) epoxy resin (i) having a number average molecular weight ($\overline{M}_n$) between about 150 and about 2000, and (ii) having two or more reactive epoxide groups per molecule; and
      (b) reactive elastomer (i) having a number average molecular weight ($\overline{M}_n$) of between about 2000 and about 10,000, (ii) having reactive functionality capable of reacting with the epoxide group of said epoxy resin, and (iii) being liquid at 20°-25° C.;
   wherein (a) and (b) are combined in amounts providing between about 1.8 and about 3.0 epoxide groups of said resin for each said reactive functionality of said elastomer and reacted so as to react at least about 80% of said reactive functionality of said elastomer;
   (2) between about 10 and about 25 parts by weight of microcrystalline wax; and
   (3) between about 50 and about 80 parts by weight of a dispersion of a petroleum sulfonate complex in nonvolatile diluent oil, (i) said complex comprising between about 30 and about 80 weight percent of said dispersion and (ii) said oil having a boiling point above about 230° C.,
   wherein the total weight of said (1), (2) and (3) is 100 parts by weight.

2. A sprayable hot melt corrosion preventative composition according to claim 1, wherein said epoxy resin is diepoxide resin having a number average molecular weight ($\overline{M}_n$) of between about 200 and about 1500.

3. A sprayable hot melt corrosion preventative composition according to claim 2, wherein said diepoxide resin is the reaction produce of epichlorohydrin and bisphenol A.

4. A sprayable hot melt corrosion preventative composition according to claim 1, wherein said elastomer has a number average molecular weight ($\overline{M}_n$) of between about 2,000 and about 5,000.

5. A sprayable hot melt corrosion preventative composition according to claim 1 or 4, wherein said reactive functionality of said elastomer is selected from the group consisting of (i) carboxyl groups, (ii) amino groups, (iii) hydroxyl groups and (iv) mixtures thereof.

6. A sprayable hot melt corrosion preventative composition according to claim 5, wherein said elastomer contains about two of said reactive functionality per molecule.

7. A sprayable hot melt corrosion preventative composition according to claim 1, wherein said adduct mixture is formed by reacting said epoxy resin and said elastomer in amounts providing between about 1.8 and 2.5 epoxide groups of said resin for each reactive functionality of said elastomer.

8. A sprayable hot melt corrosion preventative composition according to claim 7, wherein said adduct mixture is formed by reacting said epoxy resin and said elastomer in amounts providing between about 2.0 and about 2.5 epoxide groups of said resin for each reactive functionality of said elastomer.

9. A sprayable hot melt corrosion preventative composition according to claims 1 or 8, wherein said epoxy resin and said elastomer are reacted so as to react at least about 90% of said reactive functionality of said elastomer.

10. A sprayable hot melt corrosion preventative composition according to claim 1, wherein said petroleum sulfonate complex comprises between about 50 and about 70 weight percent of said dispersion.

11. A sprayable hot melt corrosion preventative composition according to claim 1, wherein said dispersion provides between about 25 and 40 parts by weight of said petroleum sulfonate complex.

12. A sprayable hot melt corrosion preventative composition according to claim 1, wherein said sulfonate complex is selected from the group consisting of sulfonate complexes of magnesium, calcium, barium, sodium and mixtures thereof.

13. A sprayable hot melt corrosion preventative composition according to claim 1 further comprising up to about 20 parts by weight fillers, pigments, diluent oil and mixtures thereof.

14. A sprayable hot melt corrosion preventative composition which, exclusive of pigments, filler and other non-reactive components, is characterized in consisting essentially of:
   (1) between about 10 and about 25 parts by weight of an epoxy resin elastomer adduct mixture formed by reacting:
      (a) epoxy resin (i) having a number average molecular weight ($\overline{M}_n$) of between about 150 and about 2000 and (ii) being the reaction product of epichlorohydrin and bisphenol A;
      (b) reactive elastomer (i) having a number average molecular weight ($\overline{M}_n$) of between about 2000 and about 10,000, (ii) having about two carboxyl functionalities per molecule, and (iii) being liquid at 20°-25° C.;
   wherein (a) and (b) are combined in amounts providing between about 1.8 and about 3.0 epoxide groups of said resin for each carboxyl functionality of said elastomer and reacted so as to react at least about 80% of said carboxyl functionalities of said elastomer,
   (2) between about 10 and about 25 parts by weight of microcrystalline wax; and
   (3) between about 50 and about 80 parts by weight of a dispersion of a petroleum sulfonate complex in nonvolatile diluent oil, (i) said complex comprising between about 50 and about 70 weight percent of said dispersion and (ii) said oil having a boiling point above about 230° C.,
   wherein the total weight of said (1), (2) and (3) is 100 parts by weight.

15. A method for making a hot melt corrosion preventive composition characterized in that said composition is made by:
   providing between about 10 and about 25 parts by weight of an epoxy resin elastomer adduct mixture which is maintained at an elevated temperature;
   homogeneously blending into said adduct mixture between about 10 and about 25 parts by weight microcrystalline wax while maintaining said elevated temperature;

heating between about 50 and about 80 parts by weight of a dispersion comprising sulfonate complex in diluent oil to an elevated temperature; and adding the homogeneous adduct-wax mixture with stirring into said dispersion while maintaining said elevated temperatures thereof so as to form a homogeneous corrosion preventative composition, wherein said epoxy resin elastomer adduct mixture is formed by reacting:

(a) epoxy resin having (i) a number average molecular weight ($\overline{M}_n$) of between about 150 and about 2000, and (ii) having two or more epoxide groups per molecule; and (b) reactive elastomer (i) having a number average molecular weight ($\overline{M}_n$) of between about 2,000 and about 10,000, (ii) having reactive functionality capable of reacting with the epoxide groups of said epoxy resin, and (iii) being liquid at 20°–25° C.;

wherein (a) and (b) are combined in amounts providing between about 1.8 and about 3.0 epoxide groups of said resin for each said reactive functionality of said elastomer and reacted so as to react at least about 80% of said reactive functionality of said elastomer and, wherein said dispersion comprises a petroleum sulfonate complex in nonvolatile diluent oil, (i) said complex comprising between about 30 and about 80 weight percent of said dispersion and (ii) said oil having a boiling point above about 230° C., and wherein the total weight of said adduct mixture, said microcrystalline wax, and said dispersion is 100 parts by weight.

* * * * *